Dec. 19, 1933.  G. ARMS  1,940,040
LIGHT MODIFYING MEANS
Filed Feb. 24, 1933   3 Sheets-Sheet 1
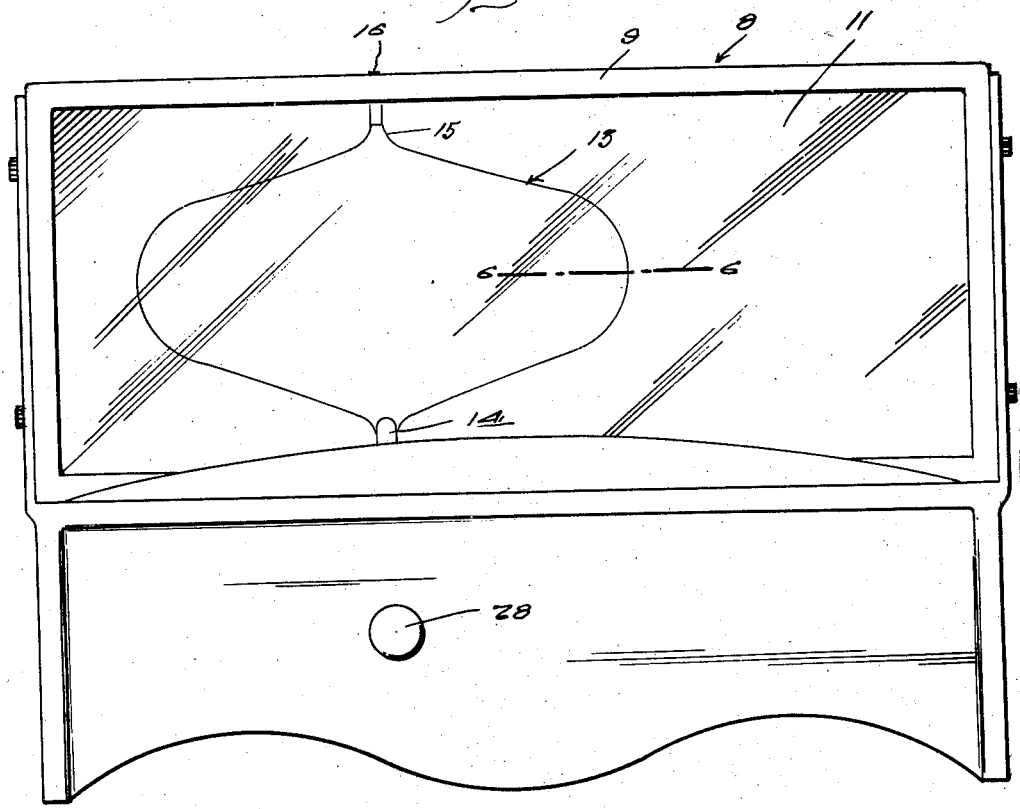
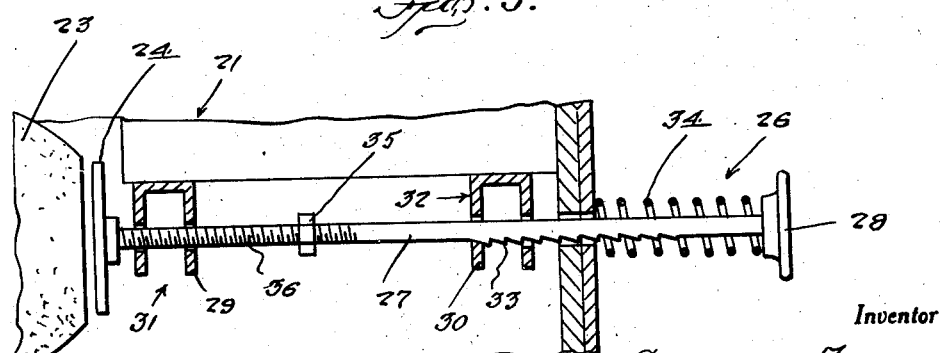
Inventor
George Arms Dec. 19, 1933.          G. ARMS          1,940,040
LIGHT MODIFYING MEANS
Filed Feb. 24, 1933          3 Sheets-Sheet 2
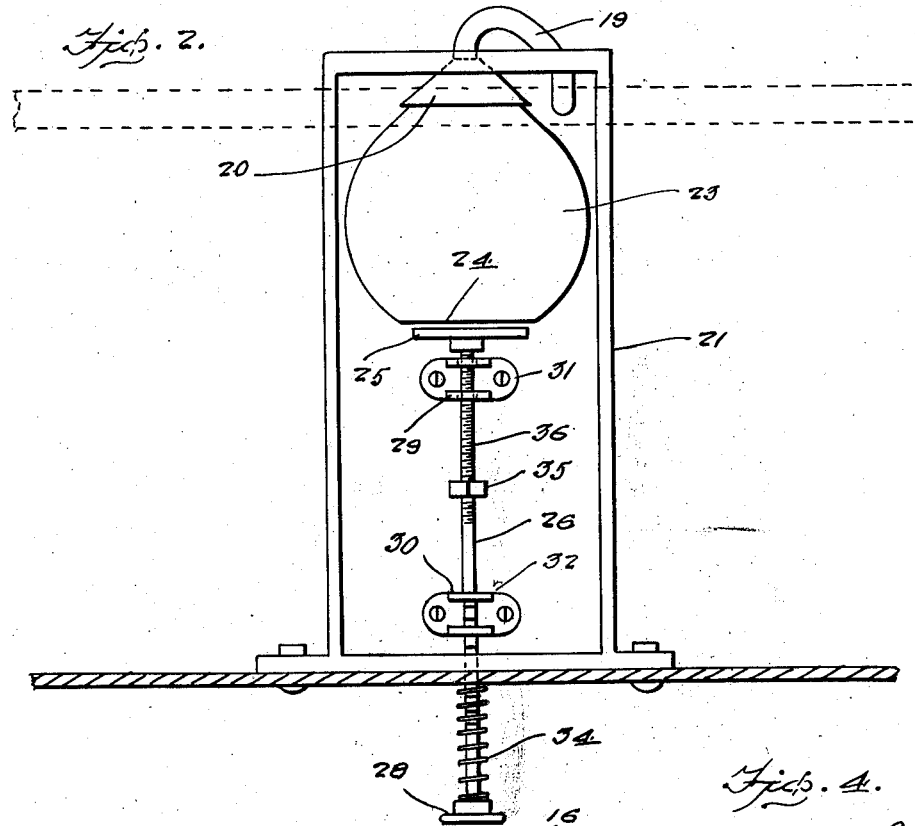
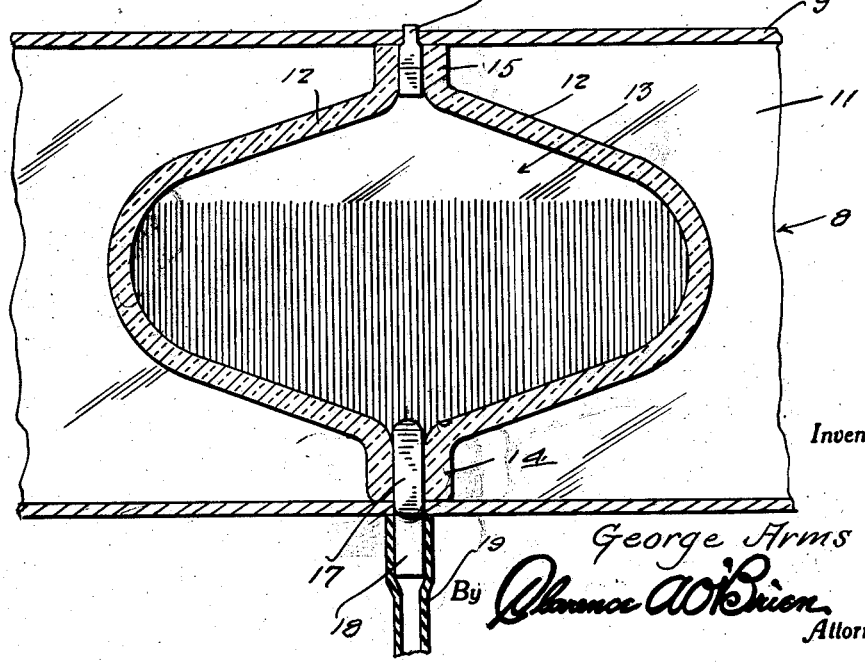
Inventor
George Arms
By Clarence A. O'Brien
Attorney Dec. 19, 1933.  G. ARMS  1,940,040
LIGHT MODIFYING MEANS
Filed Feb. 24, 1933  3 Sheets-Sheet 3
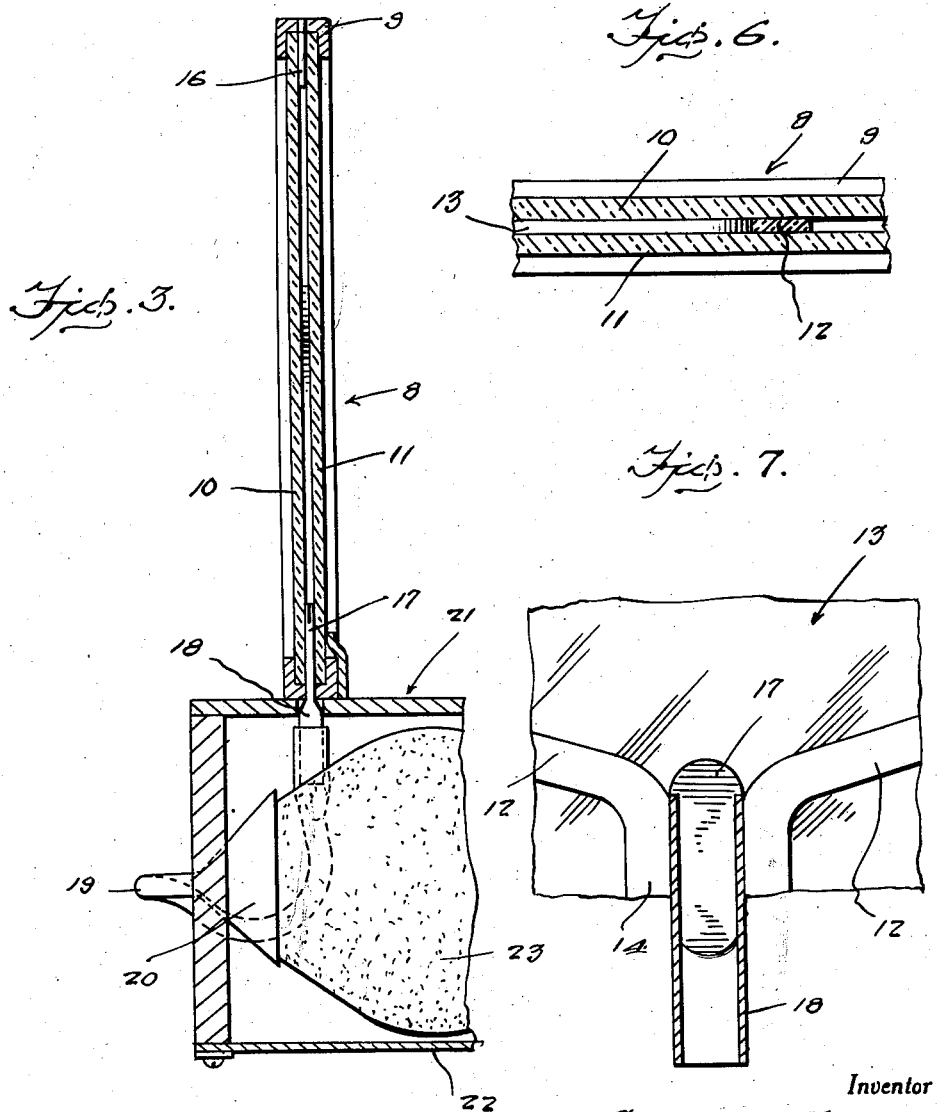

Patented Dec. 19, 1933

1,940,040

UNITED STATES PATENT OFFICE 1,940,040

LIGHT MODIFYING MEANS

George Arms, Huntington Station, N. Y.

Application February 24, 1933. Serial No. 658,456

2 Claims. (Cl. 296—97)

This invention relates to an improved means expressly designed and constructed for modifying artificial and natural light rays, the same being adapted for use on an automobile and its accompanying windshield to function as an anti-glare structure.

The principal feature of the improved arrangement is predicated upon a windshield of an especially adapted type equipped with a unique liquid filled modifier constructed in a manner to intercept and diffuse light rays originating from an external source while not interfering with clear vision of the driver from the interior of the car.

Manifestly the primary purpose of the invention is to provide a windshield embodying anti-glare means of the aforesaid type intended to modify the incoming rays either from the sun or headlights of oncoming vehicles in such a manner as to minimize blinding glare and to thereby promote more dependable and safe driving as a result of clear vision.

Another feature of the construction is predicated upon a windshield of the aforementioned construction and special mechanical means for injecting the liquid or fluid into the special windshield container and withdrawing it therefrom whenever necessary or desired.

Other features and advantages will become more readily apparent from the following description and drawings.

In the drawings:

Figure 1 is an elevational view of a windshield constructed in accordance with my idea.

Figure 2 is a bottom plan view of the liquid retaining bulb and expulsion plunger associated therewith.

Figure 3 is a vertical sectional view of the complete assembly with parts in elevation.

Figure 4 is a sectional end elevational view detailing the container for the liquid film or screen.

Figure 5 is a detail view of the spring returned plunger and retaining means therefor.

Figure 6 is a detail section on the plane of the line 6—6 of Figure 1.

Figure 7 is an enlarged fragmentary view detailing the liquid feeder.

In the general assembly represented in Figure 3 it will be observed that the windshield is generally denoted by the numeral 8 and comprises an appropriate frame 9 and inner and outer spaced glass plates or panels 10 and 11 respectively. These are spaced apart by spacing elements or strips 12 (see Figures 6 and 7). These elements 12 are shaped as shown in Figure 4 to define a somewhat oval shaped liquid receiving container or receptacle 13 into which the liquid film or screen is fed. In fact the parts 12 are shaped to define an intake neck 14 at the bottom and a discharge neck 15 at the top. In the discharge neck is a suitably constructed air vent 16 to prevent the receptacle from becoming air bound. Fitted into the neck 14 as shown in Figure 7 is an appropriate liquid feeder 17 having an attaching nipple 18 for a rubber or flexible hose 19. This hose is provided at its intake end with a funnel 20 located in a casing 21 supported from the instrument board or dash as the case may be. This casing 21 is of any appropriate construction so as to accommodate the mechanism illustrated in Figure 2. By preference it is formed as shown in Figure 3 with a removable bottom 22 to permit access to be had to the parts on the interior of the casing. These parts comprise a rubber liquid holding bulb 23 suitably supported in the container and discharging into the funnel in a liquid tight manner. One end of the bulb is flattened as indicated at 24 to accommodate the disk like head 25 on the plunger 26. As shown in Figure 5 the plunger embodies a rod 27 formed on its outer end with a knob 28 conveniently located on the instrument board as shown in Figure 1 for expeditious operation. The rod extends through apertures in suspension ears 29 and 30 carried by the hanger brackets 31 and 32. The rod 27 is provided with rack teeth 33 engageable with the apertures in the ears 30 to hold the rod in the set position. The numeral 34 merely designates a coiled return spring for the plunger. The numeral 35 designates a stop nut engageable with the bracket 31 and adjustably mounted on the threads 36. This stop nut serves as a regulator to determine the amount of liquid expelled from the bulb when it is placed under compression.

It is evident that the liquid, which may be of appropriate transparent and tinted character is normally held in the inflated bulb 23. When it is desired to shoot the liquid into the receptacle 13 this is done by forcing the plunger 26 in against the bulb and compressing the bulb to expel the liquid therefrom. This delivers the liquid up through the hose or tube 19 into the feeder 17 and then into the receptacle or container 13. The air is allowed to vent through the accessory 16. The bulb is held compressed and the plunger is maintained in a position to secure this result through the instrumentality of the teeth 33 engaging the bracket 32 as shown in Figure 5. Upon releasing the teeth and allowing the spring 34 to come into play to return the plunger 26 it is obvious that the liquid is withdrawn from the receptacle 13 into the bulb 23.

The gist of the invention is in the provision of a liquid tight suitably shaped receptacle formed in a windshield in the line of vision of the driver of the car, together with means for holding and feeding the liquid into the receptacle, or withdrawing it from the receptacle as occasion requires. As before pointed out the liquid is appropriately colored and of a transparent character so as to provide the requisite diffusing properties calculated to modify the incoming light rays and to minimize glare.

I am aware of the fact that liquid containers have been utilized as interceptors for artificial and natural light rays for modification purposes. So far as I have been able to ascertain the specific arrangement herein utilized wherein the receptacle is built into the windshield and provided with an appropriate vent and means for supplying and withdrawing the liquid is new.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

Having thus described my invention, what I claim as new is:

1. A windshield of the class described comprising a frame, inner and outer spaced transparent members mounted in said frame, a pair of strips mounted between the transparent members in liquid-tight relationship and extending from the top piece of the frame to the bottom piece thereof, the major portions of the strips being bowed outwardly away from each other to form a chamber, the front and rear walls of which are formed by portions of the transparent members, the ends of the two strips being parallel to each other and slightly spaced apart to form necks for the chamber, the top piece of the frame having an opening therein in communication with the upper neck and the bottom piece of the frame having an opening therein in communication with the lower neck, a liquid holding bulb and a conduit for connecting the bulb to the lower neck.

2. A windshield of the class described comprising a frame, front and rear spaced transparent members mounted in said frame, a pair of strips mounted between the transparent members in liquid-tight relationship, said strips extending from the top piece of the frame to the bottom piece thereof and having their major portions bowed outwardly away from each other to form a chamber, the front and rear walls of which are formed by parts of the transparent members, the ends of the strips being parallel and slightly spaced apart to provide upper and lower necks for the chamber, a tubular member extending through the top piece of the frame into the upper neck to provide a vent, a second tubular member extending through the bottom piece of the frame into the lower neck and a liquid holding bulb connected to the second tubular member.

GEORGE ARMS.